United States Patent [19]
Titcomb et al.

[11] 3,979,523

[45] Sept. 7, 1976

[54] REDUCED CALORIE BREAD AND METHOD OF MAKING SAME

[75] Inventors: Stanley T. Titcomb, Portchester; Arthur A. Juers, Baldwin, both of N.Y.

[73] Assignee: International Telephone and Telegraph Corporation, Nutley, N.J.

[22] Filed: July 30, 1974

[21] Appl. No.: 494,011

[52] U.S. Cl. .................................. 426/19; 426/62; 426/549; 426/555
[51] Int. Cl.² ............................................ A20D 2/00
[58] Field of Search ................. 426/19, 21, 26, 62, 426/152, 549, 555

[56] References Cited
UNITED STATES PATENTS

| | | |
|---|---|---|
| 3,023,104 | 2/1962 | Pattista .............................. 426/152 |
| 3,574,634 | 4/1971 | Singer ................................ 426/19 X |
| 3,676,150 | 7/1972 | Glicksman et al. ................ 426/19 X |
| 3,767,423 | 10/1973 | Tsantir et al. ......................... 426/62 |

*Primary Examiner*—Raymond N. Jones
*Attorney, Agent, or Firm*—John T. O'Halloran; Thomas M. Marshall

[57] ABSTRACT

The bread composition incorporates a cellulose additive in precise amounts to produce a resultant white bread product having at least 25% less calories than the comparable standard white bread product. The composition also includes taste enhancements so that the reduced calorie bread will have the same eating quality and texture as the standard white bread.

5 Claims, No Drawings

REDUCED CALORIE BREAD AND METHOD OF MAKING SAME

BACKGROUND OF THE INVENTION

This invention relates to a low calorie bread and more particularly, to a low calorie white enriched bread.

It has long been desired, and many attempts have been made in the food industry, to produce a low calorie white enriched bread which may be used in place of the standard white enriched bread, since it has become a standard in the industry and widely accepted by young and old alike. Accordingly, sliced white bread has become so common to the consuming public that its volume of consumption has never been approached by any of the other breads combined, i.e. ryes, proteins, rolls, and the like. Contributing to its appeal is the taste, softness, toastability, texture, and eating quality of white bread. Further, its use for making large number of sandwiches daily has brought its use to the point that there has been no close competitor in satisfying the consuming public.

However, with this standard white enriched bread, there is a definite problem of the amount of caloric intake per bread slice and in some cases, in elderly persons, the white enriched bread has affected their digestive and elimination systems due to the consistency and texture of white bread. It has become extremely difficult for people to diet, as well as for old people to change their eating habits, because of the desire and habits of using white enriched bread. One of the past problems in substituting a low calorie bread for the standard white enriched bread has been the reluctance of the consuming public, children to adults, to reach for the low calorie bread. Many of these factors include: "It did not look the same."; "It did not feel the same."; and "It did not have the same texture and taste as enriched white bread." Therefore, reduced calorie bread has never been accepted by the general public, to their health detriment.

The invention attempts to overcome these problems by providing a reduced calorie white enriched bread of at least 25% while maintaining the standard enriched white bread eating quality and texture, without reducing any mineral or protein value in the new low calorie bread loaf.

SUMMARY OF THE INVENTION

It is therefore an object of this invention to produce a low calorie bread product which overcomes the prior art problems.

It is also an object of the invention to produce a low calorie white enriched bread product having at least a 25% reduction in caloric content as compared to the standard white enriched bread.

According to the broader aspects of the invention, the bread composition incorporates a selective cellulose additive in precise amounts together with taste enhancements to produce a resultant white enriched bread product having 25% less caloric content than the comparable standard white enriched bread.

A feature of the invention is the elimination of some of the caloric contributing ingredients and the addition of ingredients not normally found in white enriched bread while still producing a product having the same size and eating quality and texture of the white enriched bread.

DESCRIPTION OF THE PREFERRED EMBODIMENT

In order to solve the problems inherent in the prior art, it was necessary prior to producing an interchangeable and equally acceptable white enriched low calorie bread to define and set the goals for the degree of caloric reduction possible. It was determined that a much greater than 25% caloric reduction would not make a comparable low calorie bread with any consumer acceptance. It was also determined that prior art attempts for producing a bread with 10 to 15% fewer calories did not have sufficient caloric reduction to have any impact on the consuming public to warrant large scale production of such a minimal reduced calorie loaf. The goal established and finally to be accepted by the FDA is a low calorie enriched white bread having at least 25% reduction in caloric content.

In order to fully appreciate the invention, the following typical standard formulation for white enriched bread according to the prior art is tabulated. The concentrations of ingredients are indicated in parts by weight based on 100 lbs. flour and identified according to standards in the industry.

STANDARD WHITE ENRICHED BREAD

| INGREDIENTS | Parts By Weight Based On 100 Lbs. Flour |
|---|---|
| SPONGE | |
| Wheat Flour, Patent | 65.00 |
| Yeast | 2.50 |
| Yeast Food | 0.50 |
| Hydrated Mono and Diglycerides | 0.75 |
| Lard | 3.00 |
| Water | 37.00 |
| Enrichment "M" | Two tablets |
| DOUGH | |
| Flour | 35.00 |
| Salt | 2.25 |
| Corn Sugar (dry) | 10.00 |
| Soy Flour and Whey | 2.00 |
| Calcium Sulfate | 0.40 |
| Calcium Propionate | 0.10 |
| Water | 24.00 |

PROCEDURE

The procedure for the standard bread is to mix the sponge ingredients in a standard mixer for approximately 4 minutes and allow the sponge to ferment for approximately 4 hours at about 76° F. The sponge is then combined with the dough ingredients and mixed for approximately 10 minutes. The mixed dough is then allowed to relax for an additional 30 minutes before weighing and 10 minutes before shaping into individual loaves which are placed in bread pans and allowed to proof for approximately one hour. The proofed loaves are baked for approximately 21 minutes at 415° F., cooled and sliced.

The foregoing ingredient composition and procedure is established for large commercial bakeries. The sponge and dough ingredients are handled in a manner which facilitates large volume production of bread for shipping and delivering to retail outlets with a minimum of holding time from production of the sponge to purchase by the consumer.

With the foregoing in mind and within the same standard of art in the industry, it was necessary to discover an ingredient mix and procedure in keeping with the standard commercial procedures to produce a loaf having 25% less calories.

It was determined from the standard formula that the patent wheat flour content should be reduced, that the lard should be eliminated, and that the corn sugar should be reduced and changed. A wheat protein, gluten, was added in substantial amounts to compensate for the loss in protein value due to the reduction of flour, a selected cellulose was incorporated in precise amounts, and of additional significance, brown sugar was incorporated in reduced amounts and a slight amount of flavoring. The preferred combination is listed in the following example. Example I provides the gum-free formulation and method for producing the 25% reduced calorie white enriched bread; the ingredients are indicated in parts by weight based on 100 lbs. total flour in accordance with industry procedures.

EXAMPLE I

REDUCED CALORIE WHITE ENRICHED BREAD

| INGREDIENTS | Parts By Weight Based On 100 Lbs. Total Flour |
|---|---|
| SPONGE | |
| Wheat Flour, Patent | 70.00 |
| Wheat Gluten | 2.00 |
| Yeast | 2.00 |
| Yeast Food | 0.50 |
| Emplex (1) | 0.50 |
| Water | 41.00 |
| Enrichment "M" (2) | Three tablets |
| DOUGH | |
| Wheat Flour, Patent | 30.00 |
| Salt | 3.00 |
| Brown Sugar (6) | 6.00 |
| Soy Flour and Whey (3) | 3.00 |
| Wheat Gluten | 8.00 |
| Calcium Sulfate | 1.25 |
| Calcium Propionate | 0.50 |
| Selected Cellulose (4) | 22.00 |
| Yeast | 1.50 |
| Water | 74.22 |
| Flavor (5) | .09 |

(1) A dough conditioning additive produced by C.J. Paterson Co., Kansas City, Mo.
(2) A vitamin and mineral enrichment, identified as No. 335, by Paniplus, Kansas City, Mo.
(3) Marketed as Extram C by Paniplus, Kansas City, Mo.
(4) Selectedcellulose:
 (a) Cellulose BH200, the International Filler Corporation, No. Tonawanda, New York having the following characteristics:

| Grade No. BH 200 | | |
|---|---|---|
| Raw Material | Bleached Sulphite Woodpulp (Hardwood) | |
| Chemical Properties: | Alpha Content | 89.0% |
| | 10% KOH Sol. | 17.0% |
| | Ether Extract | 0.24% |
| | G.E. Brightness | 94.0% |
| Physical Properties: | Moisture | 5-7% |
| | Bulk Density | 135 ML/50 Gram |
| | Typical Screen Analysis | |
| | % on | % thru |
| 100 Mesh | 2.5 | |
| 200 Mesh | 10.0 | 86.0 |

(b) Also found acceptable in the Example and with similar characteristics was Cellulose BW-200 produced by Brown Company/Berlin-Gorham Division, Berlin, N. H.
(5) Firmenich Flavor, Type F-5109/TP, Firmenich, Inc., New York, N. Y.
(6) Golden Brown No. 10, Amstar Corporation, New York, N. Y.

PROCEDURE

The reduced calorie white enriched bread was prepared according to the following procedure:
Mix sponge 4 minutes (high speed) in Day Horizontal mixer.
Set sponge at 76° F.
Ferment for 3½ hours.
Mix dough 12 minutes (high speed) in Day Horizontal mixer.
(To full development, dry and extensible dough.)
Hold out the salt until pick-up. (5 minutes)
Dough temp. 80° F. after mixing.
Dough fermentation time 20 minutes.
Scaling weight 18 ¾ ounces.
Intermediate Proof 10 minutes.
Shape and place in pan 8½ × 4½ × 3¼ inches.
Proof to ¾ inch above pan.
Bake 18 minutes at 450° F.
Cool and slice.

RESULTS

The approximate 220 loaves which were produced from the example were analyzed and evaluated to confirm that the low calorie bread was similar in all respects to the standard white enriched bread including quality, specific volume color, grain and texture, crumb and taste. The differences, if any, from the standard white enriched bread were for all intent and purposes undetectable by the evaluators.

EXAMPLE II

The procedure for Example I was repeated with the selected cellulose content varying from 15 to 21 parts by weight of total flour. Adjustments were made in the water content to obtain the normal dough by procedures familiar to those skilled in the art.

The resultant loaves were evaluated and it was determined that they did not meet the requirements of at least 25% reduction in caloric content.

EXAMPLE III

The procedure for Example I was repeated with the selected cellulose content increasing from 22 up to 25 parts by weight of total flour with appropriate adjustments in the water content. The water content adjustments were made by procedures familiar to those skilled in the art to obtain the normal dough. The results obtained with the increased amount up to 25% were also acceptable and met the minimum requirements of 25% reduction of calories from the standard formula, and the bread had a satisfactory color, grain, texture and eating quality.

EXAMPLE IV

The procedure for Example I was varied with the selected cellulose content increasing from 26 to 30 parts by weight of total flour with appropriate adjustments in water content to compensate for the increase in cellulose and to obtain the normal dough. The results were unsatisfactory and there was an adverse effect on the grain and texture of the bread and it did not produce a loaf satisfactory in eating quality. With an increasing content of cellulose, the resultant product had less appeal than the standard white enriched bread due to many factors including poor slicing ability, a gummy texture and poor grain.

EXAMPLE V

The procedure for Example I was repeated with the brown sugar reduced 20% and the flavoring was varied 20%. The results were also found to be acceptable and met the minimum requirements.

The foregoing examples and evaluations indicate that a 25% reduced caloric content white enriched bread could be produced having equivalent taste, texture and appeal to the standard white enriched bread if a selected cellulose was critically controlled in relation to the total flour content and also, if other adjustments were made to provide an equivalent tasting end product.

In order to substantiate our evaluation, and to demonstrate meaningful results and benefits gained by utilizing the low calorie white enriched bread, a clinical test was conducted with 16 college students. The students were divided into two groups, eight individuals in each group, all on a similar diet with the exception that one group ate 12 slices per day of standard white enriched bread, and the other group ate 12 slices per day of reduced calorie white enriched bread. The test was conducted for an 8 week period with 13 students completing the test. Seven students completed the test in the standard white enriched bread group, and six students completed the test in the reduced calorie white enriched bread group. Each student in each group consumed the 12 slices per day in addition to the other food provided. Documentation was made for the weight reduction while the usual nutritional guide lines were adhered to. The composite person for the group eating the 12 slices per day of the standard formula white enriched bread lost 13.6 pounds or 1.7 pounds per week or approximately 32% of their excess weight. The composite person for the group consuming 12 slices per day of the reduced calorie white enriched bread lost 19.3 pounds or 2.4 pounds per week or a loss of 41% of the excess weight, this additional loss of weight being solely attributed to the difference in consumption of the reduced calorie bread in place of white bread. In addition, it was indicated by those consuming the reduced calorie bread that it was in most, if not substantially all, factors the same and as acceptable to them as consuming the standard white enriched bread of which they were generally accustomed.

It is anticipated for the future, in evaluating the reduced calorie formula bread, that substantial benefits may be obtainable by elderly persons who consume the reduced calorie bread, the benefits deriving mainly from the increased consumption of a cellulose which will provide the necessary roughage to contribute to the proper functioning of their digestive and elimination systems. This contribution will not be at the expense of reducing the nutritional value obtainable from the reduced calorie bread, nor will it sacrifice the taste, texture and eating quality which most elderly people have long been accustomed in consuming the standard white enriched bread formulation. These evaluations in connection with this new reduced calorie formulated white enriched bread indicate that a significantly improved formulation has been achieved which substantially advances the value to the consumer without reducing the standard white enriched bread nutrition, appeal and eatability.

It should also be understood by those skilled in the art that while the specific baking examples referred to above are given according to the standard sponge dough procedure utilized in the baking industry, with only slight modifications therefrom the baking results obtained are valid not only for this sponge dough method but also for the continuous mix, short time, no time, and straight dough methods.

While we have described above the principles of our invention in connection with specific examples and method steps, it is to be clearly understood that the description and examples are made only to enable practicing of the invention and not as a limitation to the scope of the invention as set forth in the objects thereof and in the accompanying claims.

We claim:

1. A reduced calorie white enriched bread having fewer calories compared to conventional white enriched bread equal in size and volume, the bread consisting essentially of about 10 parts by weight of wheat gluten, about 5–6 parts by weight of brown sugar, and 22–25 parts by weight of an alpha-cellulose per 100 parts by weight of wheat flour.

2. A composition for preparing a reduced calorie yeast-raised white bread product which is gum-free, consisting essentially of 100 parts by weight of wheat flour:
   10 parts by weight of wheat gluten;
   5–6 parts by weight of brown sugar; and
   22–25 parts by weight of an alpha cellulose.

3. The combination of claim 2 including about 0.1 parts by weight of a flavoring.

4. A reduced calorie white bread composition having fewer calories compared to conventional white enriched bread and being similar in specific volume, color, grain, texture, crumb, and taste, the dry mix ingredients in parts by weight based on total flour consisting essentially of:
   100 parts by weight wheat flour;
   10 parts by weight of wheat gluten;
   3.5 parts by weight of yeast, and 0.5 parts by weight yeast food;
   3 parts by weight salt;
   5–6 parts by weight brown sugar;
   3 parts by weight of whey and soy flour; and
   22–25 parts by weight of an alpha cellulose.

5. In the method of making a reduced calorie yeast-leavened, gum-free white bread product having less calories compared to conventional white bread of similar size and volume, and comprising the steps of preparing a sponge of wheat flour, wheat gluten, yeast and yeast food, and water, and forming a dough from the sponge by adding salt, whey and soy flour, and additional wheat gluten, wheat flour, yeast and water, the improvement comprising the step of adding to the dough formulation 22–25 parts by weight of an alpha cellulose and 5–6 parts by weight of brown sugar based on the total flour content.

* * * * *